Aug. 12, 1924.
F. W. MANNING
PROCESS OF DECOLORIZING OIL
Filed March 13, 1920
1,504,772
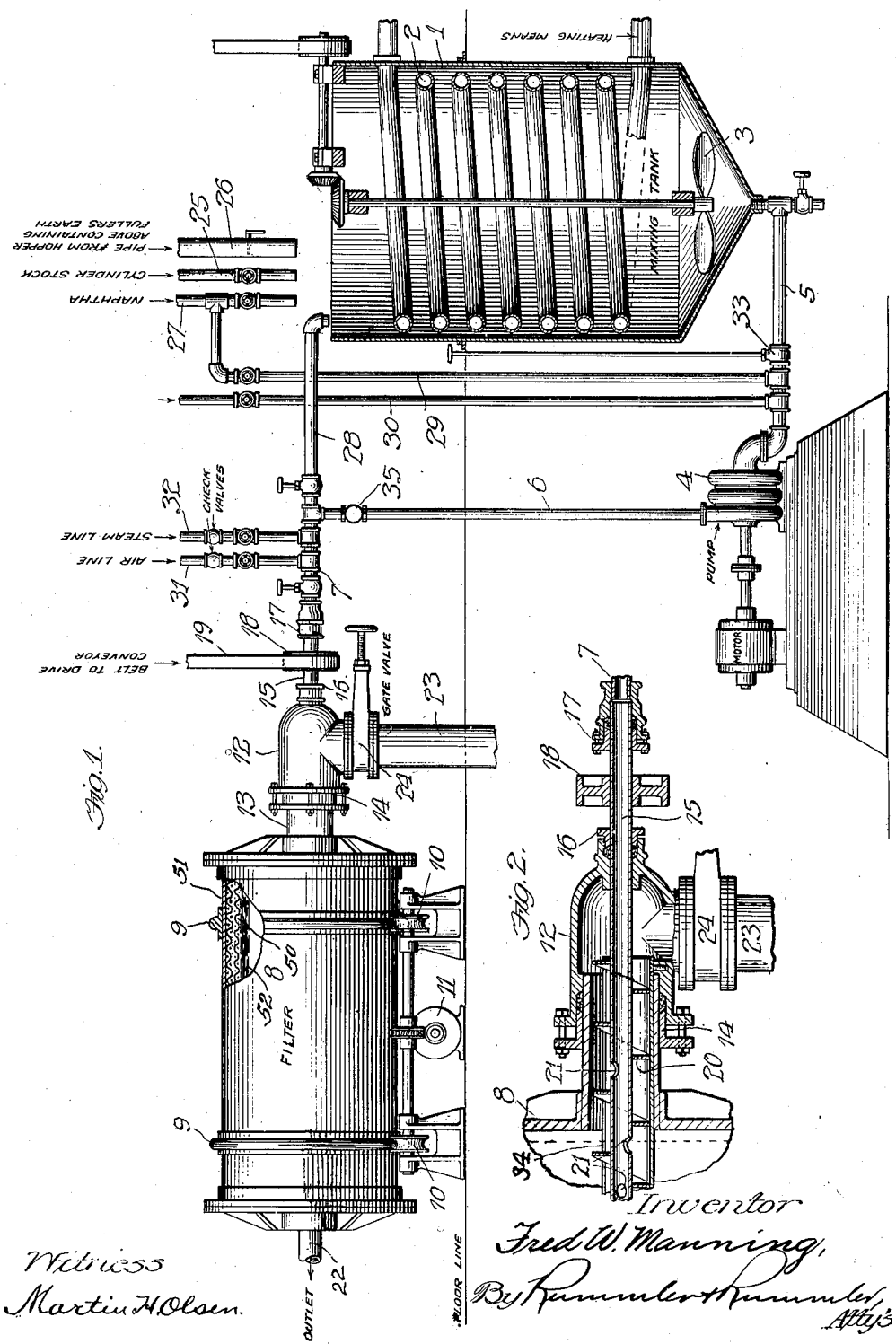

Patented Aug. 12, 1924.

1,504,772

UNITED STATES PATENT OFFICE.

FRED W. MANNING, OF CHICAGO, ILLINOIS, ASSIGNOR TO MANNING REFINING EQUIPMENT CORPORATION, A CORPORATION OF DELAWARE.

PROCESS OF DECOLORIZING OIL.

Application filed March 13, 1920. Serial No 365,537.

*To all whom it may concern:*

Be it known that I, FRED W. MANNING, a subject of the King of Great Britain, and a resident of Chicago, county of Cook, and State of Illinois, have invented certain new and useful Improvements in a Process of Decolorizing Oil, of which the following is a specification.

This invention relates to filtering and particularly to the process of filtering petroleum oil products, shale oils or other mineral oils through fuller's earth or other filtering medium for the purpose of decolorizing or otherwise purifying them. More specifically it relates to an improved method of first bringing the oil into contact with a limited quantity of a decolorizing medium and then quickly separating it therefrom so that great gains in efficiency, speed and plant capacity are secured over the methods hitherto used.

It is well known to those versed in the art that the method of filtering oils now generally used and particularly with mineral oils, through fuller's earth is both cumbersome and inefficient. In fact, it is only the outgrowth of the first crude attempts to improve the color and nature of oil products by filteration. The usual practice where petroleum products such as lubricating oils, cylinder stocks, etc., are filtered, is to charge from 20 to 50 tons of coarse fuller's earth into vertical filters or percolators, these being guilt of light steel plate as practice has proven that high pressures are not applicable to this method of filtering. Common practice is to feed the oil into the top of the percolators and filtered by gravity at atmospheric pressure, although some refineries filter under a low pressure of five to fifteen pounds. The oil remaining in the earth is then driven out to some extent by air pressure, is then more thoroughly taken out by a naphtha wash and the naphtha is then steamed out.

There are serious objections to the present method of filtration, above described, among which are, the slow rate of filtration and the great length of time required for operations other than those producing filtered oil, due to the great depth of fuller's earth usually varying from 15 to 20 feet in the vertical type filter; the tendency to channel allowing unfiltered stock to get into the filtrate; the low yield of filtrate per pound of clay due to the tendency of the unfiltered stock to pass down thru the filter between the coarse grains instead of thru the grains of fuller's earth; fractional filtration which means that for a certain quantity of unfiltered stock charged to the filter, only a limited amount of a given grade of filtrate can be taken off, the stream of oil from the filter becoming more and more like the original stock charged to the filter as filtration proceeds, the spent earth being saturated at the end of the filtration period with oil almost as impure as the original stock; and the impossibility of using the fine mesh earth which occurs at the mills when grinding the coarse sizes and which loss is of serious importance to the mill owners as it amounts to about 15 per cent of the total amount mined and sold for treating mineral oils.

I have discovered that much better results can be obtained by using a very fine grade of fuller's earth, usually 60 mesh and finer in accordance with my improved process instead of the coarse earth now employed in the usual methods; earth of, say, 16 to 30 mesh. The earth of this fineness, practically all of which is now thrown on the dump or run into the rivers, exposes a much larger amount of colloidal siliceous matter to act upon the coloring matter of the oil, and results in a much smaller quantity of earth being required. The fine earth in the required amount is quickly mixed with the oil to give a suspension which, because of the relatively small proportion of earth, is easily pumped and handled. The decolorizing action, because of the intimacy of contact of fine earth and oil, is practically instantaneous, taking place during the mixing. Any long continued action of the earth on the oil results in other changes than the simple decolorization and purification here desired; but no substantial time is here afforded for such changes. When the mixture is made, all the actions here desired are completed, and the mixture is at once separated; high pressure and a quickly acting type of filtering apparatus being employed to hasten the separation.

The operation of my improved process can be best described in connection with a representation of suitable apparatus such as is shown in the accompanying drawing, in which Fig. 1 is a diagrammatic elevation of a specific assembly of apparatus suitable for carrying out the improved process.

Fig. 2 is an enlarged fragmentary sectional detail of the fitting through which the material is fed to the filter.

The apparatus, which for the sake of clearness is shown diagrammatically without strict regard to proportion of various parts, comprises a mixing tank 1 equipped with heating coils 2 or suitable means for heating its contents and with a mechanical mixing means, as for example, rotary paddles 3, a pump 4 and suitable pipes 5, 6 and 7 connecting the mixing tank 1 with a pressure filter 8 which may be of the type described in my copending application filed September 18, 1919, Serial No. 324,507. As there shown, the drum is provided with an annular wall 50 of perforated, slotted or reticulated metal within screen wall 51. On 50 the separated fine earth banks up as indicated at 52. In the form shown, the filter comprises a cylindrical shell having annular tracks 9 supported on four rollers 10 and equipped with mechanism for rotating the drum, which mechanism may consist of a motor 11 operatively connected to the rollers 10.

A stationary fitting 12 located in axial alinement with the filter 8 is connected with one end of the filter by means of a pipe 13 and stuffing box 14. The inlet pipe 15 which connects the pipe 7 with the interior of the filter, extends through the fitting 12 and is provided with suitable stuffing boxes 16 and 17 where it enters said fitting and connects with the pipe 7. Said tube carries a pulley 18 whereby it may be driven by a belt 19. A spiral conveyor 20 having a hollow shaft is connected to and operated by the tube 15. As shown, this hollow shaft is a continuation of tube 15. The interior of the conveyor shaft communicates with the interior of the filter through apertures 21. The outlet for the filtrate is indicated at 22. After the filtering medium such as fuller's earth has served its purpose and becomes charged with coloring matter, it is discharged from the filter by means of the conveyor 20 and a pipe 23 which is connected with the fitting 12 and controlled by a gate valve 24. The oil that is to be refined, as for example, cylinder stock, is conducted to the mixing tank 1 by a valve controlled pipe 25. Fuller's earth is supplied by the pipe 26, naphtha by the pipe 27. The pipe 27 is also connected by a pipe 29 with the pipe 5 on the suction side of the pump 4 so that naphtha may be pumped direct to the filter for the purpose of washing the filter medium, and a pipe 30 is provided and connected with a suitable tank not shown, whereby the naphtha which is used for a final wash in recovering oil from the filtering medium, can be conducted back to the pump and used for a first wash for the next batch. The pipe 7 has connected directly thereto, pipes 31 and 32 which are respectively connected to sources of air and steam under pressure.

In carrying out the improved method of refining oil, the unrefined oil is discharged by the pipe 25 into the mixing tank 1, and if this oil is heavy and thick as for example in the case of cylinder stock, the tank may be heated to render the oil more fluid. A suitable quantity of fuller's earth is also discharged into the tank from the pipe 26, and the earth and oil are thoroughly mixed by means of the power driven paddle 3. This earth is of the fine grades now not used and discarded; material of a fineness of 60 to 100 mesh and finer. With heavy oils of high viscosity, say, 150 to 300 at the filtration temperature, earth between 60 and 100 mesh is suitable but for lighter oils whose viscosity is, or can be, reduced below 150, still finer mesh, say 100 mesh or finer, is advisable. The valve 33 is then opened, and the pump 4 is operated for forcing the mixed oil and earth into the filter where it passes out of the apertures 21 in the hollow conveyor shaft, overflows the conveyor trough 34 and is distributed over the filtering surfaces whereby the earth is separated from the oil. Instead of heating thick oil to thin it, it may be thinned with a little naphtha.

As stated complete decolorization takes place almost immediately when the earth and oil come together in the mixing tank, due to the fineness of the fuller's earth, and filtration is advantageously effected immediately thereafter at a great speed under high pressure in this type of rotary filter. The rotation of the filter uniformly distributes the quickly settling earth over the filtering surfaces and avoids the effects of channeling which occur in the usual percolating filters. The rotary filter is advantageous in carrying out the herein described process because by its use the earth is distributed over the annular filtering surface in a comparatively thin compact layer and at the same time almost completely fills the filter, and this facilitates the other operations such as airing, washing, and steaming and permits these operations also to take place at great speed under pressure. It is not desirable to have earth and oil remain in contact any longer than is absolutely necessary. Fractional filtration is completely avoided because decolorization takes place in the mixing tank where there is an even distribution of earth throughout the oil. Because of this fact, the oil which is held up in the earth during the filtering process is equal in quality to the filtered oil and may be added to it after being taken out of the earth by air pressure and naphtha wash. There is little of this retained oil because of the fineness of the earth and the compactness of the layer. And what little there is can be readily and quickly displaced by a naphtha wash without much dilution by the naphtha. Moreover any quantity of oil of any required color may be produced by simple regulation of the quantities and proportions of the oil and earth in the mixing tank.

When the free spaces in the filter have become filled with earth, the filtering operation is discontinued by stopping the pump 4 and closing the valve 35. The residue of oil held up in the clay is removed by air under pressure from the line 31, followed by successive washes of naphtha, usually two. This washing is done methodically. The naphtha for the first wash is a second wash from a prior operation and is obtained from the pipe 30 and is forced through the filter by means of the pump 4. The second or final wash is fresh naphtha drawn from the pipe 27. The mixture of oil and naphtha resulting from the first wash is added to the filtered oil and conveyed into a suitable tank not shown. The naphtha is then separated from the oil by distillation. The naphtha which is used in the final wash, having but a small charge of oil, is sent to a separate tank communicating with the pipe 30 and is used as the first wash in the next cycle of operations.

After the washing operations have been completed and the naphtha has been steamed out, the earth in the filter is left in the form of a dry powder and is discharged from the filter by means of a conveyor and pipe 23.

This invention is not limited to any specific form of apparatus but resides in the described process steps, which may be carried out by a variety of apparatus.

By hydrocarbon oils I refer to those obtained from mineral sources.

I claim:

1. The process for improving hydrocarbon oils by quickly mixing with them fine fuller's earth, then quickly filtering out the earth under heavy pressure and displacing residual oil by naphtha introduced under pressure.

2. The process of improving hydrocarbon oils which consists in first quickly mixing the oil with fine fuller's earth, then passing the mixture through a pressure filter to separate the oil and earth and then washing the residue of oil from the earth by means of a solvent of hydrocarbon oil.

3. The process of purifying hydrocarbon oils which consists of quickly mixing powdered fuller's earth with the oil, then quickly filtering out the earth at high pressure, passing air through the earth to blow out residual oil, then washing the earth with naphtha, and finally passing steam through the earth to remove the naphtha.

4. The process of purifying hydrocarbon oils which consists of quickly mixing powdered fuller's earth with the oil, then quickly filtering out the earth at high pressure, and then subjecting the earth to successive washes of naphtha, the liquid resulting from a second washing in a prior operation being used as a first washing agent.

5. A process of purifying hydrocarbon oils in which the oil is first mixed with a fine purifying agent and the resulting mixture passed through a pressure filter to separate the oil and agent, the steps, in combination, of building up upon a rotatable cylindrical filter element a cake having only its outer surface in contact therewith and separating the residual oil from the agent by contacting it with a non-aqueous washing medium.

Signed at Chicago this 5th day of March, 1920.

FRED W. MANNING.